Aug. 8, 1939.  F. TRACHSEL  2,168,965
RECORDING DEVICE
Filed Oct. 18, 1935
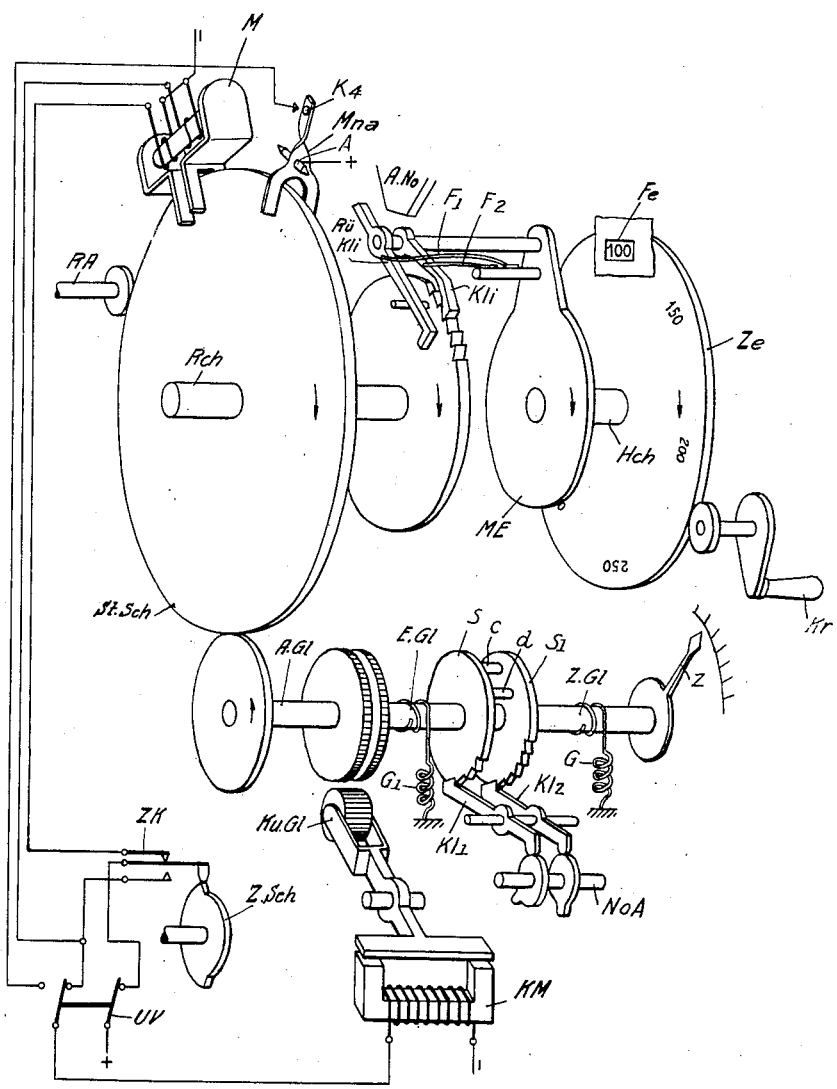
INVENTOR
F. Trachsel
BY
E. H. Wenderoth
ATTORNEY Patented Aug. 8, 1939

2,168,965

UNITED STATES PATENT OFFICE 2,168,965

RECORDING DEVICE

Fritz Trachsel, Bumpliz-Bern, Switzerland

Application October 18, 1935, Serial No. 45,674
In Switzerland October 18, 1934

5 Claims. (Cl. 235—104)

It is often necessary, in motor vehicles, to measure and record operations temporarily. After an automobile accident it is of importance to know the conduct of the car on the last stretch before the accident. It should be possible to reconstruct this last stretch as nearly accurately as possible since the previously traveled stretches are no longer of importance.

There are recording apparatus in which the operations are inscribed on a running strip, so that they can be read off later. Such apparatus, however, requires the use of a great deal of recording paper and at times there may be no strip present at the time desired to be reviewed. Also, such arrangements do not permit of the operations to be kept sufficiently separated, as the paper advance or feed is too small.

It has therefore been proposed to make the recording paper endless and to extinguish the old recordings, so that the paper could be used for new ones. Up to the present, however, no satisfactory solution for such permanent operation has been found.

The present invention relates to a recording apparatus on motor vehicles wherein means are present to magnetize steel sporadically by at least one electromagnet and to review the magnetically inscribed steel subsequently to control an indicating mechanism. Electric impulses can be retained, for a long time, and they can again be reviewed later with suitable apparatus. It is also extremely easy again to rectify the polarity of the steel, so that an indication may be easily extinguished.

The cancellation or rectification can be done by means of a special electromagnet. It is also possible, however, to do without the latter, as the re-magnetization always negatives the old polarity.

In the use of the recording apparatus with speedometers the steel to be magnetized can be moved proportional to the speed of travel, while the electromagnet is excited by impulses at equal time intervals. In this manner the vehicle speed can be ascertained later by measuring the length of the impulses.

The steel may be of different shapes, for example, that of an endless strip, an endless wire, or disc-shaped. It may also be in laminated form such as plates. The plates can be attached to a wheel and insulated from each other. The plates can either be arranged rotatably while the electromagnets are fixed, or vice versa. The plates may be reviewed by induction coils in which currents are generated by the different magnetizations of the steel and which are then passed to an impulse inscriber. It is also possible to transmit the attraction and repellant forces which the magnetized steel has directly to an impulse inscriber or recorder. The reviewing magnets may be constructed, for example, as permanent magnets and, through a contact, control the magnets of an impulse inscriber.

Such a recorder is described hereinafter as an exemplary embodiment.

The figure illustrates a diagrammatic view of one embodiment of the invention.

In the figure there is shown a recording apparatus in the form of a magnetizable steel disc StSch with a magnet M. The disc is normally driven from the vehicle wheel, not shown through the driven shaft Ra. A chronometer actuates the time switch ZK which excites the magnet, so that the circuit is reversed at accurate time intervals.

The magnet M engaging with its poles over the margin of the disc StSch has two windings which are wound in opposite directions, so that current flows through the core in two opposite directions, according to the position of the disc Z Sch. The poles of the magnet change their polarity according to the direction of the current and transmit the power flux from the magnet M to the disc StSch, which is of magnetizable material, for example hard steel. A permanent positive or negative field of force is thus generated on the part of disc StSch between the poles.

As a result of the shifting of the switch ZK, which takes place in constant time intervals by means of a clockwork not shown on the drawing, a field of force is generated in magnet M, between its poles of different direction, and a field of force of opposite polarity is thereupon produced on the disc StSch.

The disc rotates continually as long as the vehicle is in operation. If the disc describes more than one revolution the fields of force generated by the magnets overlap. Therefore the field of force previously impressed on the disc is cancelled by the new one and the latter remains on the disc. The fields of force which were impressed on the disc during its last revolution are always present thereon.

At the same time, by means of the time switch Zk, the coupling magnet KM can be excited according to the position of the switch UV. This coupling magnet provides for the periodical coupling of the adjusting or setting member EGL with the drive member AGL. The member EGL is freely rotatable, while the drive member AGL is positively connected with the drive shaft RA through the disc StSch.

If the drive member AGL and the setting member EGL are driven together for a period of time through the action of the coupling magnet KM and the coupling member KuGl, the angular throw of the setting member EGL corresponds to the speed of the vehicle. The setting member EGL is provided with an abutment C, which carries along the indicator member ZGL by its lug or abutment d against the action of the spring G, and thus determines the position of the indicator Z.

Connected with the toothed discs S and Sl of the setting member and the indicator member are pawls $Kl_2$ and $Kl_1$ which hold the indicator member in its adjusted position until the pawls are removed by the cam shaft NoA and rendered inoperative. The setting member and the indicator member are then moved back to their initial position through the action of the springs G and $G_1$. After termination of a winding period the pawl $Kl_2$ releases the indicator member ZGL, so that it can be adjusted according to the setting member EGL. The cam wheel NoA may be driven by a clockwork with a transmission suitable for the purpose.

If the vehicle stops and the speed during the last stretch is to be ascertained, the following takes place:

In the first place the switch UV is shifted so that it receives the current impulses from the magnet needle Mna. Then, by means of the crank Kr, the recording apparatus or the steel disc StSch is again rotated once in the same direction as when driven from the wheel of the vehicle. The coupling magnet KM is controlled by the magnet needle Mna, which reviews the magnetization fields placed on the steel disc.

This takes place in the following manner. The oscillatably mounted needle Mna has, under the pivot pin A, a positive and a negative pole arm, both of which engage over the edge of disc StSch. Disposed above the axis or pin A and integral therewith is the contact tongue $K_4$. The fields of force, with the same polarity, at both sides on disc StSch exert static attraction and repelling forces on the pole arms of the needle Mna and through the influence thereof it swings to and fro about the axis A on rotation of disc StSch according to the magnitude of these fields, and actuates contact $K_4$. The drive member and the coupling member are thus controlled at equal intervals, as they were influenced during the travel through the last stretch involved. The indicator Z is thus also adjusted correspondingly, that is, it reproduces the course or extent of the speeds of the last stretch of travel.

The crank drive, when the recording apparatus is rotated by the vehicle wheel, does not ordinarily run therewith, as it is disconnected by pawls Kli from the disc drive shaft after one revolution at most. However, if the hand drive shaft Hch is shifted by the hand drive it is then rotated on further travel of the vehicle, that is, through the axis Ra from the check pawl RuKli, until the disconnecting pawl Ano disconnects the check pawl against the action of springs F and $F_1$ and the hand drive again comes to a standstill.

The hand drive shaft is connected with the indicator wheel Ze, on which latter are provided the length measurements corresponding to the last traveled stretch. If it is desired to ascertain how the vehicle was driven 100 meters before stopping, the crank is turned until the mark 100 meters on the indicator wheel is visible through the window Fe. Then, for reasons previously mentioned, the indicator indicates the speed of the vehicle during the 100 m. before stopping.

Only those parts are shown which are necessary to explain the invention. The indicator member can be easily connected in known manner with a recording apparatus. The switch UV is manually operated, according to the exemplary construction shown. It is possible, however, to shift the contacts involved positively as soon as the entraining or drive disc Me is carried out of the inoperative position by the crank Kr.

What I claim is:

1. An apparatus for reproducing and indicating the rate of rotation of a shaft comprising magnetizable means, means for driving the magnetizable means at a rate proportional to the shaft speed, means for magnetizing said magnetizable means in alternate directions at regular intervals of time, means for moving said magnetizable means at a rate independently of said shaft speed, means responsive to said magnetizations and a speed-indicating device of the chronometric type driven from said last-named means and controlled by said responsive means.

2. An apparatus for reproducing and indicating the rate of rotation of a shaft comprising magnetizable means, means for driving the magnetizable means at a rate proportional to the shaft speed, means for magnetizing said magnetizable means in alternate directions at regular intervals of time, means for moving said magnetizable means at a rate independently of said shaft speed, means responsive to said magnetizations, a speed-indicating device of the chronometric type driven from said last-named means and controlled by said responsive means, and said means for magnetizing said magnetizable means including a magnet having two oppositely directed windings.

3. An apparatus for reproducing and indicating the rate of rotation of a shaft comprising magnetizable means, means for driving the magnetizable means at a rate proportional to the shaft speed, means for magnetizing said magnetizable means in alternate directions at regular intervals of time, means for moving said magnetizable means at a rate independently of said shaft speed, means responsive to said magnetizations, a speed-indicating device of the chronometric type driven from said last-named means and controlled by said responsive means, and said means responsive to said magnetizations including a magnet needle having contact arms.

4. An apparatus for reproducing and indicating the rate of rotation of a shaft comprising magnetizable means, means for driving the magnetizable means at a rate proportional to the shaft speed, means for magnetizing said magnetizable means in alternate directions at regular intervals of time, means for moving said magnetizable means at a rate independently of said shaft speed, means responsive to said magnetizations, a speed-indicating device of the chronometric type driven from said last-named means and controlled by said responsive means, said means for moving said magnetizable means at a rate independently of said shaft speed including a disk having distance graduations thereon and means for rotating said disk.

5. An apparatus for reproducing and indicating the rate of rotation of a shaft comprising magnetizable means, means for driving the magnetizable means at a rate proportional to the shaft speed, means for magnetizing said magnetizable means in alternate directions at regular intervals of time, means for moving said magnetizable means at a rate independently of said shaft speed, means responsive to said magnetizations, a speede-indicating device of the chronometric type driven from said last-named means and controlled by said responsive means, and means for disconnecting said means responsive to said magnetizations.

FRITZ TRACHSEL.